June 4, 1963 W. C. HAMPTON 3,091,957
THERMAL CONDUCTIVITY BRIDGE CIRCUIT
Filed Oct. 14, 1959 2 Sheets-Sheet 1

INVENTOR.
WILLIAM C. HAMPTON
BY Herman L. Gordon
ATTORNEY

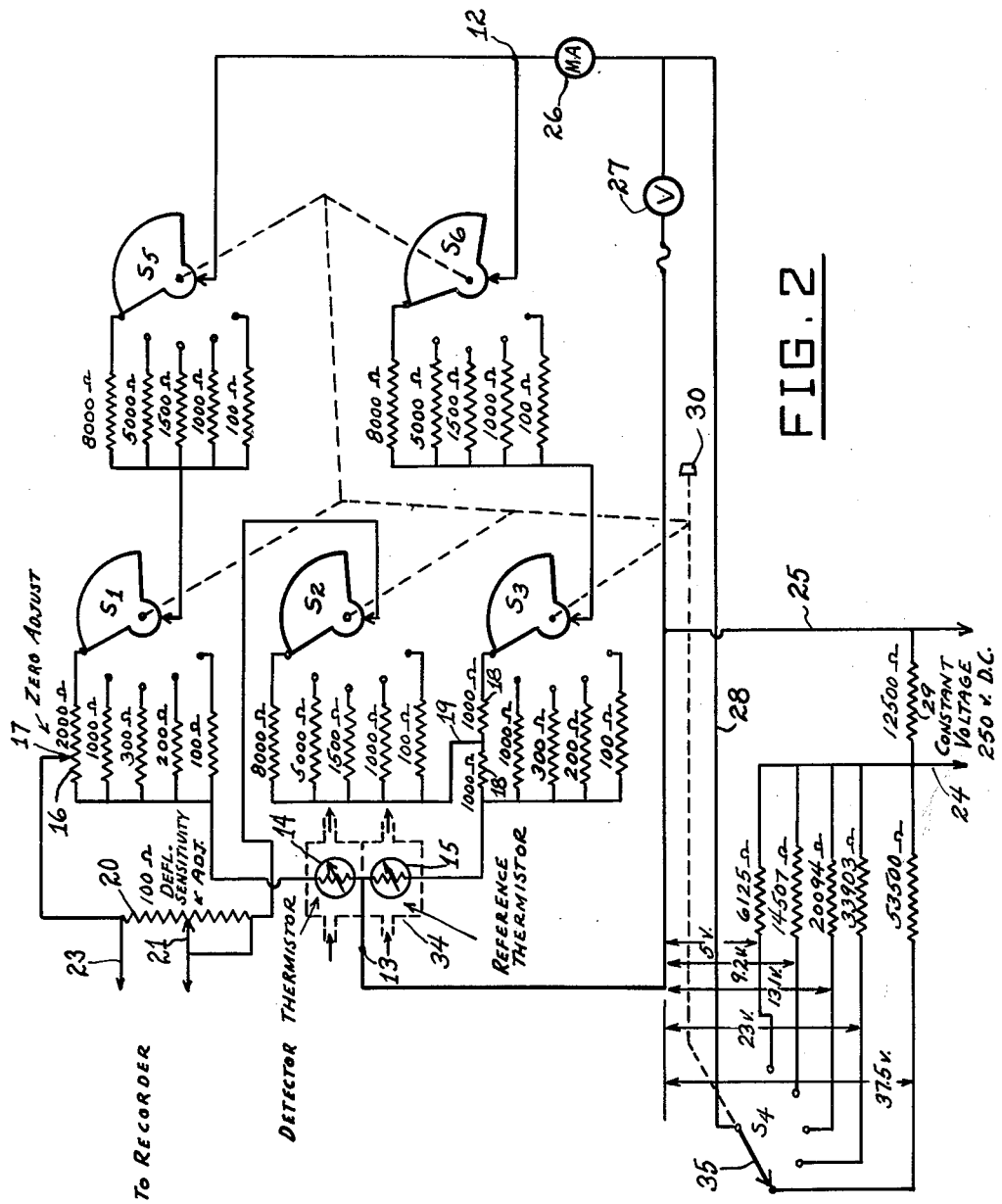

United States Patent Office

3,091,957
Patented June 4, 1963

3,091,957
THERMAL CONDUCTIVITY BRIDGE CIRCUIT
William C. Hampton, Takoma Park, Md., assignor to American Instrument Company, Inc., Silver Spring, Md.
Filed Oct. 14, 1959, Ser. No. 846,295
10 Claims. (Cl. 73—27)

This invention relates to gas chromatography apparatus, and more particularly to a high sensitivity thermal conductivity bridge circuit of the type employing thermistor detectors.

A main object of the invention is to provide a novel and improved bridge circuit for detecting changes in thermal conductivity in a thermal conductivity cell used in gas chromatography, and also adapted to be employed in other areas where measurement of temperature changes of a detector thermistor is desirable.

A further object of the invention is to provide an improved thermal conductivity detector bridge circuit which is relatively simple in construction, which has high sensitivity and efficiency over an extremely wide temperature range, and which includes means to insure that excessive current will not pass through the thermistor elements thereof, thus avoiding damage to said elements.

A still further object of the invention is to provide an improved thermal conductivity bridge circuit which is easy to manufacture, which is stable in operation, and which is readily adjustable to establish null conditions therein and to zero the recorder or indicating device associated therewith to form a base line for deflection indications.

A still further object of the invention is to provide an improved thermal conductivity bridge circuit employing thermistors as the reference and detector temperature-sensitive elements thereof, said circuit being operable over a plurality of bands defining an extremely wide total range of temperatures and being provided with easily operable means to switch from one band of temperatures to another and being provided with means to maintain the watts dissipated in both the reference and detector thermistors substantially constant throughout the total range of working temperatures of the bridge circuit, whereby the temperature rise above ambient due to self-heating of the thermistors will remain substantially constant throughout said total range of working temperatures.

Further objects and advantages of the invention will become apparent from the following description and claims, and from the accompanying drawings, wherein:

FIGURE 2 is a schematic wiring diagram of a specific embodiment of the bridge circuit of FIGURE 1.

Figure 1:
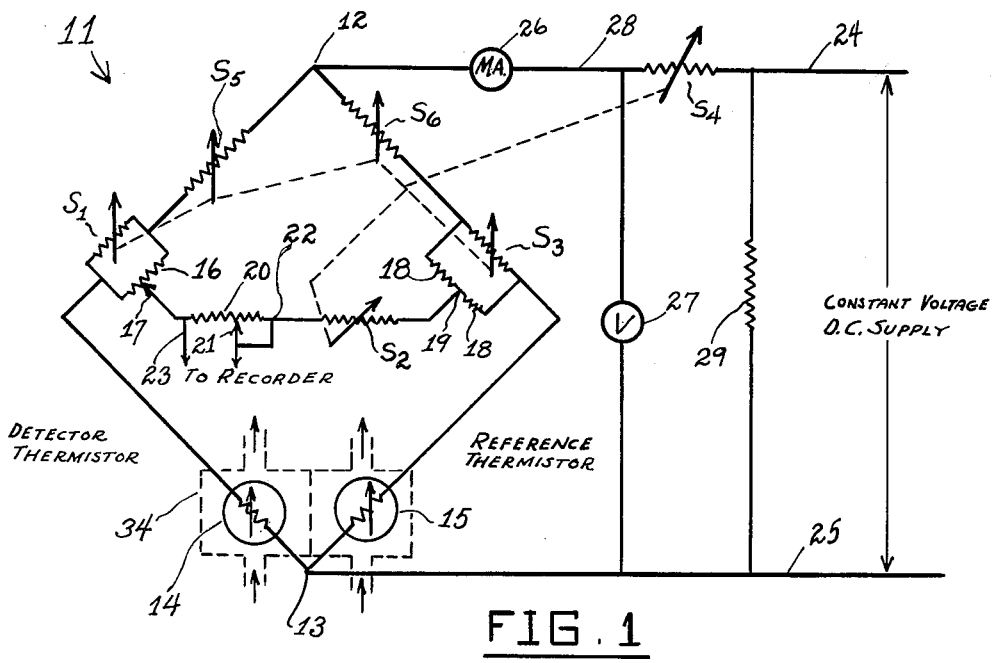
FIGURE 1 is a basic schematic wiring diagram of an improved thermal conductivity bridge circuit constructed in accordance with the present invention.

Referring to the drawings, and more particularly to FIGURE 1, 11 generally designates a thermal conductivity detection bridge circuit according to the present invention. The bridge circuit comprises the input terminals 12 and 13 between which are connected two respective branch circuits, one of which comprises the adjustable resistance members $S_5$, $S_1$ and the detector thermistor 14, connected in series, and the other of which comprises the adjustable resistance members $S_6$, $S_3$ and the reference thermistor 15, connected in series. Adjustable resistance member $S_1$ is provided with and includes the zero-adjusting potentiometer 16 having the sliding contact 17. Adjustable resistance member $S_3$ includes a branch 18, 18 having a center junction 19. Connected in series between contact 17 and junction 19 is a branch comprising the deflection sensitivity adjusting potentiometer 20 and an adjustable resistance member $S_2$. The sliding contact element 21 of potentiometer 20 is connected to the terminal 22 thereof, which is the common junction of potentiometer 20 and adjustable resistance member $S_2$. Contact element 21 and the remaining terminal 23 of the potentiometer 20 are connected to the respective terminals of a suitable direct current voltage indicator, preferably, a conventional direct current voltage recorder.

Current is supplied to the bridge circuit from a pair of supply wires 24 and 25 connected to a constant-voltage source of direct current. Supply wire 24 is connected to input terminal 12 through an adjustable resistance member $S_4$ and a milliammeter 26. Supply wire 25 is connected to bridge input terminal 13. A voltmeter 27 is connected between the lead wire 28, connecting adjustable resistance member $S_4$ to milliammeter 26, and the supply wire 25. A resistor 29 is connected across supply wires 24 and 25.

Figure 3:
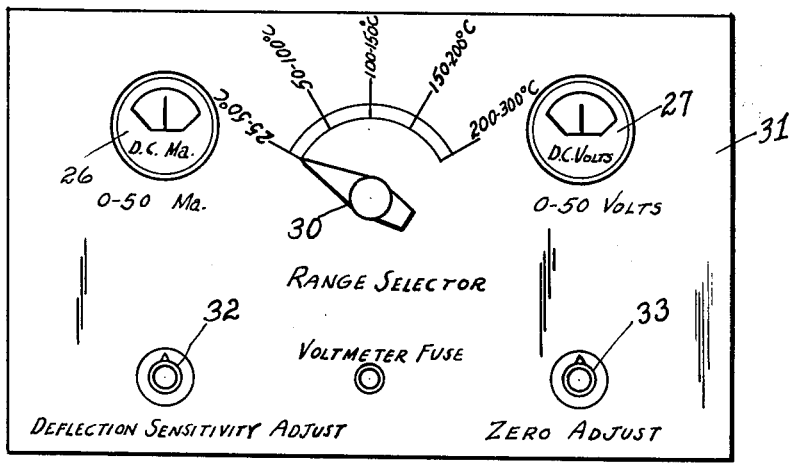
FIGURE 3 is an elevational view of the control panel associated with the bridge circuit shown in FIGURE 2.

The adjustable resistance members $S_1$, $S_2$, $S_3$, $S_4$, $S_5$ and $S_6$ are mechanically ganged for simultaneous adjustment, and are adjusted by a range selector knob 30, which may be mounted on a suitable control panel 31, as shown in FIGURE 3. The respective meters 26 and 27 may be likewise mounted on the panel 31, as shown. The panel also preferably carries the deflection sensitivity adjusting potentiometer 20, having the control knob 32, and the zero adjusting potentiometer 16, having the control knob 33.

The ratio arms $S_5$ and $S_6$ of the bridge are preferably of the stepped type, as shown in FIGURE 2, and are arranged to provide substantially equal resistance values at their different settings. The other two arms of the bridge device consist of the thermistors 14 and 15, which are preferably of the glass-coated bead type. Thermistor 14 acts as the detecting element and thermistor 15 acts as a reference element. Both are located in a thermal conductivity cell 34 wherein they are effectively exposed to the same ambient temperature but are isolated from each other. After the bridge has been balanced, any subsequent change in the temperature or resistance characteristic of the detecting element will produce an imbalance of the bridge.

The adjustable resistance members $S_1$ and $S_3$ are also preferably of the stepped type and are arranged to have substantially equal values at their different settings. As shown in FIGURE 2, the resistance members comprise individual resistors which are progressively parallel-connected by shorting rotors, operated simultaneously by the range selector knob.

To insure an accurate balance, the first resistor on member $S_1$ consists of the zero adjusting potentiometer 16, which may be a 2000 ohm, 10 turn potentiometer. The first resistor on member $S_3$, namely, resistance 18, 18, may comprise a 2000 ohm center-tapped resistor.

The adjustable resistor member $S_2$ is the same in construction and has the same resistance values as members $S_5$ and $S_6$.

The deflection sensitivity adjusting member 20 may consist of a 100 ohm, 10-turn potentiometer, the purpose of this member being to adjust the span of pen movement of the recorder, or other indicating device employed, to an amplitude representing the maximum deflection obtainable by an unbalanced condition of the bridge device.

The currents through the thermistors produce self-heating effects which cause the thermistor temperatures to be always higher than the surrounding ambient temperature. The temperature differentials thus developed are maintained by both the reference and detector thermistors throughout the working range of the device, which, in the embodiment herein illustrated is from 25° C. to 300° C.

The adjustable resistance members $S_1$ to $S_6$ may comprise a five-position, six-wafer rotary switch having five rotors of the shorting type and one rotor of the non-shorting type. The shorting rotors are employed for the members $S_1$, $S_2$, $S_3$, $S_5$ and $S_6$, to progressively parallel the respective resistors connected to their contacts in the manner illustrated in FIGURE 2. The non-shorting rotor, shown at 35, progressively connects the wire 28 to wire 24 through the respective resistors shown in FIGURE 2. Thus, the adjustable resistance members are simultaneously variable in the same sense.

With the resistance values specifically illustrated in FIGURE 2, any one of five working temperature ranges may be selected; the resultant resistance values in ohms for the respective individual resistance members are listed below:

| Range Selector Setting | $S_1$ | $S_2$ | $S_3$ | $S_4$ | $S_5$ | $S_6$ |
|---|---|---|---|---|---|---|
| 25°–50° C | 2,000 | 8,000 | 2,000 | 53,500 | 8,000 | 8,000 |
| 50°–100° C | 666 | 3077 | 666 | 33,903 | 3,077 | 3,077 |
| 100°–150° C | 207 | 1008 | 207 | 20,094 | 1,008 | 1,008 |
| 150°–200° C | 102 | 502 | 102 | 14,507 | 502 | 502 |
| 200°–300° C | 50 | 83 | 50 | 6125 | 83 | 83 |

The constant voltage direct current source is arranged to provide substantially the voltage values (as indicated on voltmeter 27) at the current values (as indicated on meter 26), as listed below:

| Range Selector Knob Setting | Bridge Voltage | Total Bridge Amps. |
|---|---|---|
| 25°–50° C | 37.5 | 0.004 |
| 50°–100° C | 23.0 | 0.0067 |
| 100°–150° C | 13.1 | 0.0118 |
| 150°–200° C | 9.2 | 0.0166 |
| 200°–300° C | 5.0 | 0.0400 |

The voltage adjustment for the bridge circuit is provided by adjustable resistance member $S_4$, which includes a single pole, non-shorting switch having a rotor 35 mechanically ganged with the shorting rotors of the remaining adjustable resistance members $S_1$, $S_2$, $S_3$, $S_5$ and $S_6$.

The resistors provided in adjustable resistance member $S_4$ are arranged to increase the voltage supply to the bridge with increased resistance in the ratio arms of said bridge.

To insure high sensitivity and maximum efficiency at all bands in the working range of temperatures, the range selector knob 30 should be placed at the setting nearest to the desired operating temperature. Selection of the proper setting insures that the voltage across the bridge will be maintained at a safe value and that there will not be excessive current in the reference and detector thermistors, thus avoiding damage to the thermistors.

Meters 27 and 26 indicate the voltage and total current through the bridge device at all times, whereby the watts dissipated in the bridge device can be computed. Hence, the temperature rise of the thermistors above ambient can be approximately computed.

The watts dissipated in both the reference and detector thermistors for any temperature in the working range will very closely approximate each other when the bridge is balanced, and will remain practically constant, under balanced conditions of the bridge, throughout the entire working range of 25° C. to 300° C. The current through the reference and detector thermistors cannot exceed a maximum predetermined allowable value throughout said working range. Changing the position of the range selector knob will automatically adjust the ratio arms of the bridge to maintain high sensitivity throughout the working range.

Changing the position of the range selector knob 30 will automatically change the effective resistance value of the "zero adjust" branch to a value equal to aproximately plus or minus 10% of the resistance value of the reference and detector thermistors within the range selected.

Changing the position of the range selector knob 30 will automatically change the resistance value between null points. This will effect an equivalent deflection adjustment for the pen of a recorder, or other indicating device employed, for a given temperature and signal input, due to unbalance of the bridge throughout the working range of 25° C. to 300° C.

Since the watts dissipated in the reference and detector thermistors are substantially the same, the temperature changes of the thermistors due to self-heating effects will be substantially the same. Therefore, drift is avoided when the bridge is balanced.

In detecting a change in thermal conductivity in a thermal conductivity cell containing the detector thermistor, unbalance of the bridge will be indicated. A given deflection will correspond substantially to the same thermal conductivity change within the working range from 25° C. to 300° C. Thus, when used for detecting changes in thermal conductivity, for the same volume of sample injection and same supporting column, and by proper adjustment of the deflection sensitivity (potentiometer 20), the deflection peaks will shows the same amplitude (corresponding to a given thermal conductivity change) within the working range of temperatures from 25° C. to 300° C.

The readings of meter 26 in amperes multiplied by the readings of voltmeter 27 will equal total watts dissipated in the bridge circuit when the bridge is balanced. The total watts dissipated, divided by four, will equal the approximate watts dissipated in each thermistor. The watts dissipated in air per degree centigrade above ambient, corrected for the carrier gas used through the thermal conductivity cell, will give a good approximation of the temperature rise above gas temperature.

The remainder of the bridge device can be located a considerable distance from the detector and reference thermistors without serious interference with the balance of the bridge circuit.

The power supply to the voltage divider circuit can be a battery or any other suitable constant voltage direct current source.

While a specific embodiment of a thermal conductivity bridge circuit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a gas chromatography apparatus, a thermal conductivity cell, respective detector and reference thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, an indicating circuit branch, means connecting said indicating circuit branch between points on said first and second circuit branches electrically located respectively between the first adjustable resistance member and the detector thermistor and between the second adjustable resistance member and the reference thermistor, a third adjustable resistance member, means connecting said source to said input terminals through said third adjustable resistance member, whereby to define a bridge circuit wherein a signal current will be developed in said indicating circuit branch responsive to a relative change in thermal conductivity adjacent said detector and reference thermistors, and means mechanically ganging said adjustable resistance members for simultaneous adjustment, said adjustable resistance members being variable in value in the same sense as they are simultaneously adjusted by said ganging means, said third adjustable resistance member being constructed and arranged to vary the voltage across said input terminals in accordance with and in the same sense as the adjustments of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

2. In a gas chromatography apparatus, a thermal conductivity cell, respective reference and detector thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, an indicating circuit branch, means connecting said indicating circuit branch between points on said first and second circuit branches electrically located respectively between the first adjustable resistance member and the detector thermistor and between the second adjustable resistance member and the reference thermistor, a third adjustable resistance member, means connecting said source to said input terminals through said third adjustable resistance member, whereby to define a bridge circuit wherein a signal current will be developed in said indicating circuit branch responsive to a relative change in thermal conductivity adjacent said detector and reference thermistors, a fourth adjustable resistance member connected in said indicating circuit branch and being constructed and arranged to compensate for changes in deflection sensitivity resulting from adjustments of the first and second resistance members, and means mechanically ganging said adjustable resistance members for simultaneous adjustment, said adjustable resistance members being variable in value in the same sense as they are simultaneously adjusted by said ganging means, said third adjustable resistance member being constructed and arranged to vary the voltage across said input terminals in accordance with and in the same sense as the adjustments of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

3. In a gas chromatography apparatus, a thermal conductivity cell, respective detector and reference thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, a balancing potentiometer connected in said first circuit branch between said first adjustable resistance member and said detector thermistor, a center-tapped resistor in said second circuit branch between said second adjustable resistance member and said reference thermistor, an indicating circuit branch, means connecting said indicating circuit branch between the adjustable contact of said balancing potentiometer and the center tap of said resistor, a third adjustable resistance member, means connecting said source to said input terminals through said third adjustable resistance member, whereby to define a bridge circuit wherein a signal current will be developed in said indicating circuit branch responsive to a relative change in thermal conductivity adjacent said detector and reference thermistors, and means mechanically ganging said adjustable resistance members for simultaneous adjustment, said adjustable resistance members being variable in value in the same sense as they are simultaneously adjusted by said ganging means, said third adjustable resistance member being constructed and arranged to vary the voltage across said input terminals in accordance with and in the same sense as the adjustments of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

4. In a gas chromatography apparatus, a thermal conductivity cell, respective detector and reference thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, a balancing potentiometer connected in said first circuit branch between said first adjustable resistance member and said detector thermistor, a center tapped resistor in said second circuit branch between said second adjustable resistance member and said reference thermistor, an indicating circuit branch, means connecting said indicating circuit branch between the adjustable contact of said balancing potentiometer and the center tap of said resistor, a third adjustable resistance member, means connecting said source to said input terminals through said third adjustable resistance member, whereby to define a bridge circuit wherein a signal current will be developed in said indicating circuit responsive to a relative change in thermal conductivity adjacent said detector and reference thermistors, a fourth adjustable resistance member connected in said indicating circuit branch, and means mechanically ganging said adjustable resistance members for simultaneous adjustment and being constructed and arranged to compensate for changes in deflection sensitivity resulting from adjustments of the first and second resistance members, said adjustable resistance members being variable in value in the same sense as they are simultaneously adjusted by said ganging means, said third adjustable resistance member being constructed and arranged to vary the voltage across said input terminals in accordance with and in the same sense as the adjustments of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

5. In a gas chromatography apparatus, a thermal conductivity cell, respective detector and reference thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, a third adjustable resistance member connected in said first circuit branch between said first adjustable resistance member and said detector thermistor, said third adjustable resistance member including a balancing potentiometer connected thereacross, a fourth adjustable resistance member connected in said second circuit branch between said second adjustable resistance member and said reference thermistor, said fourth adjustable resistance member including a center-tapped resistor connected thereacross, an indicating circuit branch, means connecting said indicating circuit branch between the adjustable contact of said balancing potentiometer and the center tap of said resistor, a fifth adjustable resistance member, means connecting said source to said input terminals through said fifth adjustable resistance member, whereby to define a bridge circuit wherein a signal current will be developed in said indicating circuit branch responsive to a relative change in thermal conductivity adjacent said detector and reference thermistors, and means mechanically ganging said adjustable resistance members for simultaneous adjustment, said adjustable resistance members being variable in the same sense as they are simultaneously adjusted by said ganging means, said fifth adjustable resistance member being constructed and arranged to vary the voltage across said input terminals in accordance with and in the same sense as the adjustment of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

6. In a gas chromatography apparatus, a thermal conductivity cell, respective detector and reference thermistors in said cell, a constant voltage source of direct current, a pair of input terminals, a first circuit branch connected between said input terminals comprising a first adjustable resistance member and said detector thermistor connected in series, a second circuit branch connected between said input terminals comprising a second adjustable resistance member and said reference thermistor connected in series, said first and second adjustable resistance members having different settings corresponding to different temperature ranges, a third adjustable resistance member connected in said first circuit branch between said first adjustable resistance member and said detector thermistor, said third adjustable resistance member including a balancing potentiometer connected thereacross, a fourth adjustable resistance member connected in said second circuit branch between said second adjustable resistance member and said reference thermistor, said fourth adjustable resistance member including a center-tapped resistor connected thereacross, an indicating circuit branch, means connecting said indicating circuit branch between the adjustable contact of said balancing potentiometer and the center tap of resistor, a fifth adjustable resistance member, means connecting said source to said input terminals through said fifth adjustable resistance member, whereby to define a bridge circuit wherein a signal current will be developed in said indicating circuit responsive to a relative change in thermal conductivity adjacent said detector and reference thermistors, a sixth adjustable resistance member connected in said indicating circuit branch and being constructed and arranged to compensate for changes in deflection sensitivity resulting from adjustments of the first and second resistance members, and means mechanically ganging said adjustable resistance members for simultaneous adjustment, said adjustable resistance members being variable in value in the same sense as they are simultaneously adjusted by said ganging means, said fifth adjustable resistance member being constructed and arranged to vary the voltage across said input terminals in accordance with and in the same sense as the adjustment of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

7. The structure of claim 6, and wherein said first and second adjustable resistance members have the same values in their various adjusted positions.

8. The structure of claim 7, and wherein said third and fourth adjustable resistance members have the same values in their various adjusted positions.

9. The structure of claim 7, and wherein said sixth adjustable resistance member has the same value as the first and second adjustable resistance members in the various adjusted positions of the resistance members.

10. A bridge circuit of the character described comprising a constant voltage source of direct current, a pair of input terminals, a first circuit branch connected between said input terminals and comprising a first thermistor and a first adjustable resistance member connected in series, a second circuit branch connected between said input terminals and comprising a second thermistor and a second adjustable resistance member connected in series, said first and second adjustable resistance members having different settings corresponding to different temperature ranges, an indicating circuit branch connected between points on said first and second circuit branches electrically located respectively between the first thermistor and the first adjustable resistance member and between the second thermistor and the second adjustable resistance member, a third adjustable resistance member, means connecting said source to said input terminals through said third adjustable resistance member, and means mechanically ganging said adjustable resistance members for simultaneous adjustment, said adjustable resistance members being variable in value in the same sense as they are simultaneously adjusted by said ganging means, said third adjustable resistance member being constructed and arranged to vary the voltage across said input terminals in accordance with and in the same sense as the adjustments of resistance of said first and second resistance members and in accordance with the expected values of resistance of the thermistors in said temperature ranges, whereby to maintain the watts dissipated in the thermistors substantially constant with the bridge circuit balanced at the various temperatures in said different temperature ranges.

References Cited in the file of this patent

UNITED STATES PATENTS 2,649,715    Goble    Aug. 25, 1953

OTHER REFERENCES

Publication: Journal of Scientific Instruments, Vol. 28, No. 6, June 1951, pages 176–179, article by Beakley, 73–362/R.

Publication in The Review of Scientific Instruments, Volume 28, Number 10, October 1957, pages 789–792 entitled "Precision Thermal-Conductivity Gas Analyzer Using Thermistors," by Walker et al. Photostatic copy in 73–27.